United States Patent
Arami et al.

[11] Patent Number: 5,920,610
[45] Date of Patent: Jul. 6, 1999

[54] SYSTEM AND METHOD FOR UPDATING DATABASE OF CUSTOMERS' TELEPHONE NUMBERS

[75] Inventors: Atsushi Arami, Tokyo; Hiroshi Satoh, Kanagawa-ken, both of Japan

[73] Assignees: Synform Co., Ltd., Okayama-ken; Arasat Corporation, Tokyo, both of Japan

[21] Appl. No.: 08/792,027

[22] Filed: Jan. 31, 1997

[30] Foreign Application Priority Data

Feb. 2, 1996 [JP] Japan ................................. 8-017238
Jan. 27, 1997 [JP] Japan ................................. 9-012386

[51] Int. Cl.$^6$ .......................... H04M 1/24; H04M 3/08; H04M 3/22

[52] U.S. Cl. .............................. 379/34; 379/112; 379/251

[58] Field of Search ................................. 379/1, 34, 32, 379/111, 112, 113, 117, 120, 133, 201, 207, 92.02, 92.04, 93.01, 93.04, 102.01, 108.01, 108.02, 381, 377, 9–10, 15, 265, 266, 251

[56] References Cited

U.S. PATENT DOCUMENTS 5,455,854  10/1995  Dilts et al. ............................. 379/201
5,796,816   8/1998  Utsumi .................................. 379/381

FOREIGN PATENT DOCUMENTS

97/01915   1/1997  WIPO ........................... H04M 1/274

*Primary Examiner*—Vivian Chang
*Assistant Examiner*—Binh K. Tieu
*Attorney, Agent, or Firm*—Wenderoth, Lind & Ponack, L.L.P.

[57] ABSTRACT

A telephone number status is rapidly and easily examined to update a telephone number list. Telephone numbers stored in a telephone number list are sequentially transmitted from an ISDN line to a telephone line in a digital communication mode for making calls, and the status of each called telephone line is determined from connection information or from a line disconnect reason received from an associated station.

4 Claims, 2 Drawing Sheets

SYSTEM AND METHOD FOR UPDATING DATABASE OF CUSTOMERS' TELEPHONE NUMBERS

BACKGROUND OF THE INVENTION

The present invention relates generally to a method and system for updating a customer telephone number list based on latest status information, and more particularly to a method and system for examining the utilization of telephone numbers by calling a telephone number on a normal analog telephone line from an ISDN (Integrated Services Digital Network) line in a digital communication mode, determining the current status of the telephone line from information obtained from such a call, and updating the telephone number list.

An example of the prior art technique for updating a telephone number list is disclosed in Japanese Laid-Open Patent Application No. 17-177214. The system disclosed in the application sequentially reads out telephone numbers from a customer telephone number list stored in a storing device, sends each telephone number to an analog public telephone network through an analog telephone line, and determines whether the called telephone number is valid or invalid from a reaction made in response to the sending of the telephone number, thereby automatically updating the telephone number list.

When a telephone number is sent to an ordinary telephone line, i.e., an analog line, the system mainly receives (1) a call back tone signal indicating that a called party is being called; (2) a busy tone signal indicating that the called party is speaking; (3) a polarity inverted signal indicating that the called party has responded to the call; or (4) a recorded audio message indicating that the called telephone number is not in use or has been changed.

The system disclosed in the aforementioned prior art determines that a telephone number is valid if a call back tone signal or a polarity inverted signal is detected within a predetermined time period after a call is made. Also, when an audio message is received, the contents of the message are recognized by an operator or is automatically perceived by a speech recognition apparatus.

Thus, the prior art system requires a sufficient waiting time for receiving a response signal from a station which attends to a calling operation.

Also, the response signal from the station attending to the calling operation may be a polarity inverted signal, a call back tone signal, a busy tone signal, or an audio message. Thus, the response signal takes a variety of signal forms, so that complicated signal detection processing is required.

Further, for perceiving the contents of an audio message, an additional time is required for recognizing the contents of the message irrespective of whether an operator intervenes or an automatic speech recognition apparatus is used.

SUMMARY OF THE INVENTION

It is an object of the present invention to provide a method and a system which are capable of solving the problems inherent to the prior art system, i.e., which is capable of rapidly and simply examining a telephone number status.

It is another object of the present invention to provide a method and a system which are capable of automatically obtaining a new telephone number when the called telephone number is changed due to, for example, moving.

The present invention is characterized by sequentially calling dial numbers included in a telephone number list in a digital communication mode utilizing an ISDN line to detect the status of a telephone line in accordance with an associated response signal.

A system for updating a telephone number database according to the present invention comprises a telephone number storing means for storing a telephone number list, calling means for sequentially reading out telephone numbers of the telephone number storing means and transmitting the read out telephone numbers onto an ISDN line through a line interface for making calls, signal detecting means for receiving a digital response signal from a station and detecting the contents of the response signal after making a call, and telephone number status storing means for storing a detected status of the line.

The telephone number status storing means automatically receives the changed telephone number if the called telephone number has been changed due to being moved.

Also, a method of updating a telephone number database comprises the steps of sequentially reading out telephone numbers of a telephone number storing means for storing a telephone number list, transmitting each of read out telephone numbers onto an ISDN line for making a call, detecting whether or not the call is connected to the line for which the call has been made, disconnecting the line when the line is connected, requesting a line disconnect reason to an associated station when the line is not connected to examine the status of the called line based on the line disconnect reason from the station, and updating the telephone number list. If the reason for disconnection is that the telephone number of the called party has been changed, the changed telephone number is stored.

BRIEF DESCRIPTION OF THE DRAWINGS

The foregoing features and other aspects of the invention are explained in the following detailed description in connection with the accompanying drawings wherein.

DETAILED DESCRIPTION OF THE PREFERRED EMBODIMENT

Figure 1:
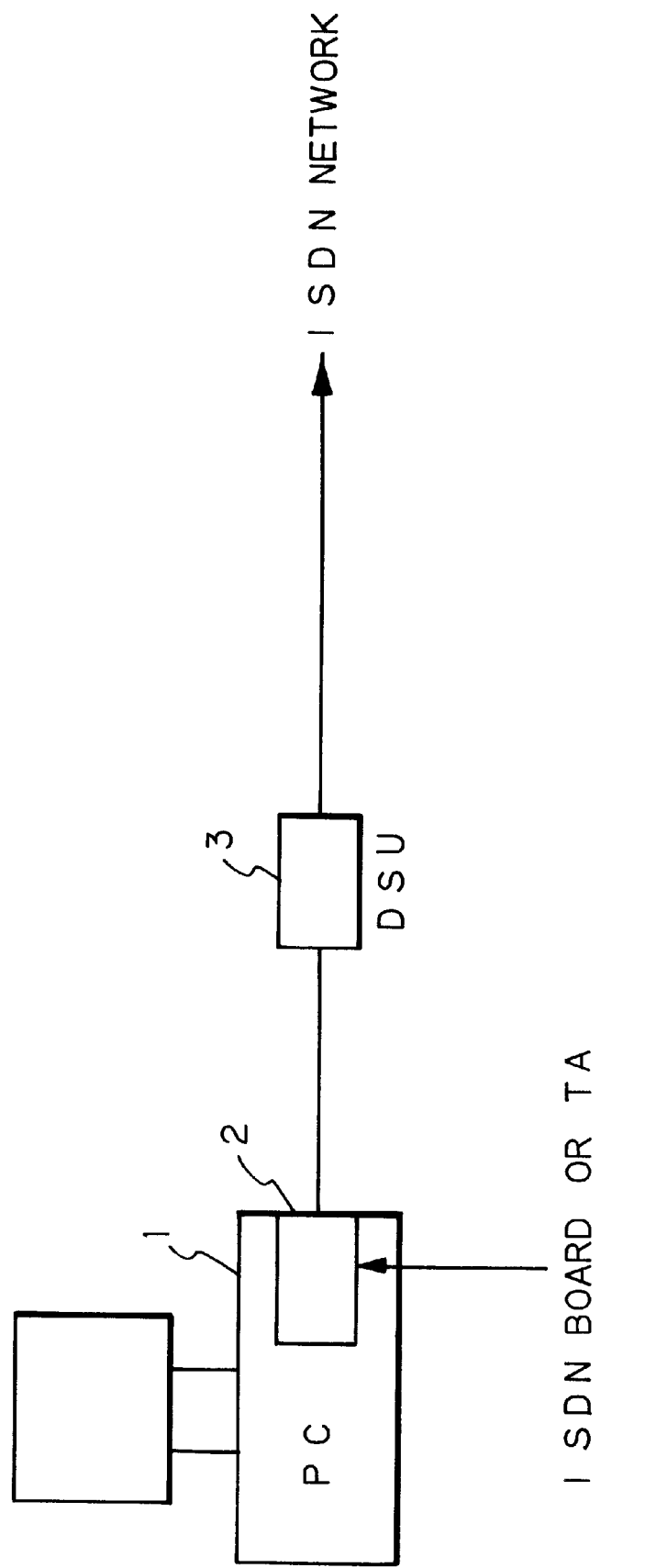
FIG. 1 shows a system structure of the customer's telephone number database updating system according to the present invention.

FIG. 1 illustrates the configuration of a system according to an embodiment of the present invention. Currently, an ISDN service is provided by NTT (Nippon Telegraph and Telephone Corporation) as INS (Information Network System) net 64 and INS net 1500. In the system of the embodiment illustrated in FIG. 1, a computer (for example, a personal computer) 1 is connected to the INS net 64 through an ISDN board 2 and a digital service unit (DSU) 3. The computer 1 comprises a CRT display, a keyboard, a central processing unit (CPU), a memory (not shown), and so on, similarly to ordinary computers. The system of this embodiment can operate in accordance with a program stored in the memory to readily examine a telephone number utilization situation. The memory also stores a list of telephone numbers for which a utilization situation is to be examined. The ISDN board 2 has a function of interface conversion between the computer 1 and ISDN network. A terminal adapter (TA) may be used instead of the ISDN board if the TA is capable of transferring a changed telephone number transmitted in accordance with Q. 931 procedure of I interface based on ITU-T (International Telecommunication Union-Telecommunication) recommendation when the called telephone number has been changed.

Figure 2:
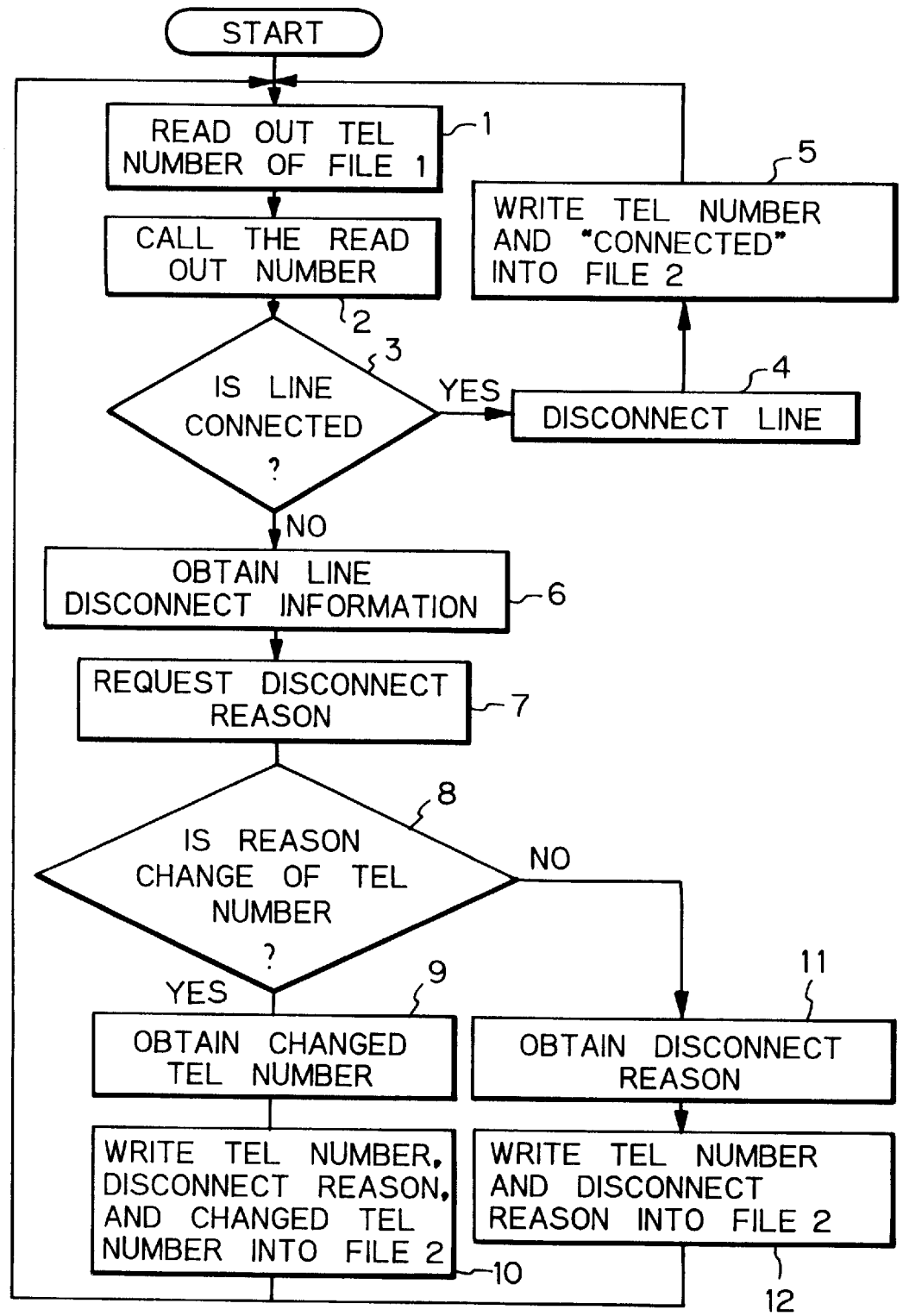
FIG. 2 is a flowchart for explaining the operation of the system illustrated in FIG. 1 which performs the updating operation in accordance with a program stored in a computer.

FIG. 2 is a flowchart for explaining the operation of the system according to this embodiment. A telephone number is read out of a file 1 including telephone number data for which a utilization situation or status is to be examined (step 1), and a call is made by sending the read telephone number in a digital communication mode (step 2).

It is then determined whether or not the line is connected as a result of the call (step 3). When a telephone number included in the data file 1 is a dial number for an ordinary telephone line or analog line, the line is not generally connected if the dial number is called in the digital communication mode. When a telephone number included in the data file 1 is a dial number for a digital line to which an equipment capable of transmitting and receiving data through the digital line, the line is connected and a connect notifying signal (INC signal) is transmitted from a station, When the connect notifying signal is received, the line is disconnected (step 4), and the telephone number and information indicative of "connected" are written into a file 2 of the computer 1 (step 5).

Usually, the line is not connected when a call is made in the digital communication mode, and a call failure indication signal (CFI signal) is received from the station (step 6). More specifically, a signal (CFIAB signal) indicating that the line is not connected, after the transmission of the telephone number has been completed, is transmitted to the system from the station, and the system responsively sends a disconnect reason request signal (RIF signal) to the station after receiving the line connection failure indicating signal (step 7). The station, in response to the disconnect reason request signal, outputs a call information response signal (LIF signal) indicative of account information, disconnect cause, and so on. The call information response signal includes information indicative of the location of a station exchanger in which the line is disconnected, and information which more specifically describes the disconnect reason, based on the ITU-T standard. When a called dial number is an analog line, the line is disconnected as mentioned above, and information indicating that "no route for destination" is received even if the dial number is valid and currently utilized. It can be thus known from the reception of the call information response signal that the called telephone number is likely to be currently utilized.

A line is disconnected by a variety of reasons in addition to the foregoing case in which a line of a called telephone number is an analog line. For example, a called telephone number may not be currently in use. In this case, however, a call information response signal including information indicating that the called telephone number is "a missing number" can be received in a digital form, so that a line status can be readily detected.

Also, when a called telephone number has been changed, an associated line is disconnected, in which case a changed telephone number is informed as "destination terminal number is changed" from station by a call information response signal in a digital form.

The next step is to determine whether the reason transmitted in response to the requested reason for disconnection is due to the change of the telephone number or not (step 8). If the telephone number has been changed, the changed number is automatically acquired in accordance with Q.931 procedure of I interface (step 9) and the called telephone number, the code indicating the reason for disconnection, and the changed new telephone number are stored in the file 2 (step 10).

If the reason for disconnection is not the change of telephone number, the reason is obtained (step 11). Then, the telephone number and the code indicating the disconnect reason are written into the file 2 (step 12), followed by reading the next telephone number from the file 1 for repeating the operations so far described. When all telephone numbers in the file 1 have been called, the file 2 is completed as an updated customer telephone number list. In the above embodiment, the file 2 is used for storing the updated data, However, the contents of the file 1 may be updated by changing the contents of the file 1 each time the response signal is received from the station without the file 2.

While the system utilizing INS net 64 has been described in the foregoing embodiment, the present invention can also provide similar functions utilizing any other ISDN line such as INS net 1500 or the like or any similar digital network.

As described above, according to the present invention, a digital telephone line or an analog signal line is called utilizing a digital line to allow for easy examination of the telephone number utilization situation. In addition, when a line is not connected, the reason for the connection failure is provided in greater detail than when an analog line is utilized for calling, and in a digital form, so that associated processing can be performed more rapidly and easily. Further, if the line is disconnected due the reason that the called telephone number has been changed, it is easy to trace a new telephone number by obtaining the new number through the digital line in a digital form.

What is claimed is;:

1. A method for obtaining a status of telephone lines associated with respective telephone numbers, wherein at least one telephone number is contained in a telephone number list, said method comprising:

reading a telephone number from the telephone number list;

transmitting the telephone number onto an ISDN line to make a call;

detecting whether or not a connection is established with a telephone line associated with the telephone number;

disconnecting the connection with the telephone line and storing information indicating that the connection was established with the telephone line when said detecting step detects that the connection is established with the telephone line;

requesting a line disconnect reason for the telephone line when said detecting step detects that the connection is not established with the telephone line; and receiving the line disconnect reason when the line disconnect reason is requested in said requesting step and storing a status of the telephone line associated with the telephone number based on the line disconnected reason received;

wherein the aforementioned steps are repeated for another telephone number when the telephone number list contains more than one telephone number.

2. A method as claimed in claim 1, wherein the telephone number is for an analog telephone line.

3. A method as claimed in claim 1, further comprising a step of obtaining a new telephone number if the line disconnect reason indicates that the telephone number has been changed.

4. A method as claimed in claim 3, wherein the telephone number is for an analog telephone line.

* * * * *